United States Patent
Paul et al.

(10) Patent No.: US 12,084,578 B2
(45) Date of Patent: Sep. 10, 2024

(54) RADIATION-CURABLE COMPOSITIONS OF PIGMENT VIOLET 23 WITH IMPROVED REMOVABILITY FROM SURFACES, METHOD OF MAKING A RADIATION-CURABLE COMPOSITION AND INK CONTAINING A RADIATION-CURABLE COMPOSITION

(71) Applicant: HEIDELBERGER DRUCKMASCHINEN AG, Heidelberg (DE)

(72) Inventors: Thomas Paul, Heidelberg (DE); Peter Hachmann, Weinheim-Hohensachsen (DE); Christoph Michel, Darmstadt (DE); Els Mannekens, Jette (BE)

(73) Assignee: Heidelberger Druckmaschinen AG, Heidelberg (DE)

( * ) Notice: Subject to any disclaimer, the term of this patent is extended or adjusted under 35 U.S.C. 154(b) by 687 days.

(21) Appl. No.: 17/005,979

(22) Filed: Aug. 28, 2020

(65) Prior Publication Data

US 2021/0062005 A1 Mar. 4, 2021

(30) Foreign Application Priority Data

Aug. 30, 2019 (DE) .............................. 102019213111

(51) Int. Cl.
C09B 19/02 (2006.01)
C09D 11/101 (2014.01)
C09D 11/322 (2014.01)

(52) U.S. Cl.
CPC ............ *C09B 19/02* (2013.01); *C09D 11/101* (2013.01); *C09D 11/322* (2013.01)

(58) Field of Classification Search
CPC . C09B 19/02; C09B 67/0066; C09B 67/0069; C09B 67/0092; C09B 67/009; C09D 11/101; C09D 11/322
See application file for complete search history.

(56) References Cited

U.S. PATENT DOCUMENTS

| | | | |
|---|---|---|---|
| 5,318,627 A * | 6/1994 | Dietz | C09B 67/0034 106/493 |
| 6,063,924 A | 5/2000 | Hall-Goulle | |
| 6,494,943 B1 | 12/2002 | Yu et al. | |
| 6,827,774 B2 | 12/2004 | Bugnon | |
| 8,197,584 B2 | 6/2012 | Claes et al. | |
| 8,313,576 B2 | 11/2012 | Deroover | |
| 9,156,989 B2 | 10/2015 | Loccufier et al. | |
| 9,453,135 B2 | 9/2016 | Andre | |
| 2007/0186804 A1* | 8/2007 | Heckmann | C09D 11/322 430/7 |
| 2009/0050014 A1 | 2/2009 | Sujeeth et al. | |
| 2012/0018687 A1 | 1/2012 | Jung et al. | |
| 2014/0326164 A1* | 11/2014 | Loccufier | C09D 11/36 544/74 |

FOREIGN PATENT DOCUMENTS

| | | |
|---|---|---|
| CN | 1481425 A | 3/2004 |
| CN | 102369244 A | 3/2012 |
| CN | 104411785 A | 3/2015 |
| EP | 0761772 A1 | 3/1997 |
| EP | 1911814 A1 | 4/2008 |
| EP | 2316886 B1 | 1/2013 |
| EP | 2604658 A1 | 6/2013 |
| JP | 2009029858 A | 2/2009 |
| JP | 2009227740 A | 10/2009 |
| JP | 2015191760 A * | 11/2015 |
| JP | 2016141767 A | 8/2016 |
| JP | 2017171789 A * | 9/2017 |
| JP | 2018177959 A * | 11/2018 |
| WO | 0130919 A1 | 5/2001 |

OTHER PUBLICATIONS

English Machine Translation of JP2017171789A ("Machine_Translation_Goi_JP_2017171789_A") (Year: 2017).*
English Machine Translation of JP2015191760A ("Machine_Translation_Himizu_JP_2015191760_A") (Year: 2015).*
Certified English translation of paragraph 0062 of JP-2015191760-A (Year: 2015).*
English machine translation of JP-2018177959-A (Year: 2018).*
English machine translation of JP-2015191760-A (Year: 2015).*

* cited by examiner

*Primary Examiner* — Jennifer A Smith
*Assistant Examiner* — Jeffrey Eugene Barzach
(74) *Attorney, Agent, or Firm* — Laurence A. Greenberg; Werner H. Stemer; Ralph E. Locher

(57) ABSTRACT

Radiation-curable compositions of Pigment Violet 23 are described which can be used advantageously in UV inks for inkjet printing machines. Soiling containing such UV inks, especially within inkjet printing machines, can be removed particularly easily in a contactless procedure with conventional cleaners. The radiation-curable compositions described contain at least one modified Pigment Violet 23 which carries at least one polar functional group of the formula (I):

$$-\text{X-E} \qquad (I)$$

where
X is a bridging group and
E is a polar molecule radical.

6 Claims, No Drawings

RADIATION-CURABLE COMPOSITIONS OF PIGMENT VIOLET 23 WITH IMPROVED REMOVABILITY FROM SURFACES, METHOD OF MAKING A RADIATION-CURABLE COMPOSITION AND INK CONTAINING A RADIATION-CURABLE COMPOSITION

CROSS-REFERENCE TO RELATED APPLICATION

This application claims the priority, under 35 U.S.C. § 119, of German patent application DE 10 2019 213 111, filed Aug. 30, 2019; the prior application is herewith incorporated by reference in its entirety.

BACKGROUND OF THE INVENTION

Field of the Invention

The present invention relates to radiation-curable compositions of Pigment Violet 23, to a method for producing such compositions, and to ink for inkjet printing that contains such compositions.

For modern-day printing processes in inkjet printing machines there is a wide selection of commercially available inks. In widespread use are UV inks, cured typically with exposure to UV radiation on the print substrate. The components of UV inks generally include not only radiation-curable organic monomers but also one or more organic or inorganic colorants. One commercially important class of colorant are the dioxazine colorants, which are renowned for their high lightfastness and durability. Having found broad application among the dioxazine colorants, in liquid and other inks and varnishes for the printing industry, is the violet dioxazine pigment C.I. Pigment Violet 23, also referred to as carbazole violet or as Pigment Violet 23.

Published, European patent application EP 1 911 814 A1, corresponding to U.S. Pat. No. 8,197,584, describes UV inks which contain pigments, dispersants, and polymerizable monomers.

European patent EP 2 316 886 B1, corresponding to U.S. Pat. No. 8,313,576, describes the production of pigments such as surface-modified Pigment Violet 23 that can be used in UV inks. As a result of the surface modification it is said to be possible to obtain particularly stable dispersions.

International patent disclosure WO 01/30919 A1, corresponding to U.S. Pat. No. 6,494,943, is concerned with the surface modification of various organic pigments with functional groups, and the use of these pigments in aqueous and nonaqueous inkjet inks.

Aqueous dispersions of Pigment Violet 23 functionalized with polar acid groups via a bridging group are also distributed commercially by Cabot Corporation, Boston, USA.

A known problem affecting the use of inkjet inks containing Pigment Violet 23 is the soiling of the printing machine. Printing machine components, especially those in the vicinity of the printheads, acquire an unwanted coating in the form of a layer of ink, which should be removed—at cost and inconvenience. The mechanical cleaning of such components, using cloths or brushes, for example, while effective, must nevertheless generally be performed manually by the operative, and frequently fails to reach all of the components, and carries an increased risk of damage to the printing machine. Oftentimes, as an alternative or in addition to the mechanical cleaning, liquid cleaning products are used in printing machines, and may also be applied automatically within the printing machine by means of special-purpose cleaning devices. In that case the risk of mechanical damage is very much lower.

It has emerged, however, that UV inks which contain Pigment Violet 23 cannot be adequately removed from the printing machine components with the usual cleaning products of the printing industry. The Pigment Violet 23 clings strongly to the surfaces and cannot be satisfactorily removed without more substantial measures.

Efforts have therefore been made to obtain a UV ink with a modified Pigment Violet 23 that can be removed effectively, using conventional cleaning products, from the surfaces in the printing machine without any need for mechanical cleaning.

BRIEF SUMMARY OF THE INVENTION

Surprisingly it has been found that UV inks containing Pigment Violet 23 can be removed effectively from the various components in the printing machine, using conventional cleaning products, if the Pigment Violet 23 contained in the UV inks has at least one polar molecule radical which is bonded to the Pigment Violet 23 via a bridging group.

The present invention relates accordingly to a radiation-curable composition containing:

a) at least one Pigment Violet 23, containing at least one functional group of the formula (I)

$$—X\text{-}E \quad (I)$$

where
X is a bridging group, and
E is a polar molecule radical,
b) at least one dispersant, and
c) a nonaqueous dispersion medium.
In one preferred embodiment E in formula (I) is $$(Z)_m(A)_n \quad \text{i.}$$

where
Z is identical or different and is at least one polar functional group,
A is identical or different and is a short-chain apolar molecule radical or a countercation,
m is 1 or 2, and
n is 1, 2, 3 or 4.
In one particularly preferred embodiment:
Z is identical or different and is selected from polar acid groups, hydroxylate, and carbonyl radical, and
A is identical or different and is selected from $C_1$-$C_5$ alkyl radical, proton, metal cations, and ammonium ion.
A $C_1$-$C_5$ alkyl radical refers to an aliphatic or branched hydrocarbon radical having 1 to 5 carbon atoms, examples being methyl, ethyl, n-propyl, and isopropyl.
In one especially preferred embodiment:
Z is identical or different and is selected from sulfonate radical, carboxylate radical, phosphate radical, and phosphonate radical, and
A is identical or different and is selected from proton, metal cation, and ammonium ion.
In a further preferred embodiment:
X is an aliphatic, aromatic or araliphatic hydrocarbon group having 1 to 12 carbon atoms and may be linear or branched, and X may contain one or more heteroatoms selected from O, S, N, and P.
In a further preferred embodiment:
X is phenylene or methylenephenylene,
Z is at least one sulfonate radical, carboxylate radical or phosphonate radical, A is at least one proton or sodium ion, and m is 1 or 2.

In one specific embodiment, the at least one functional group of the formula (I) is selected from

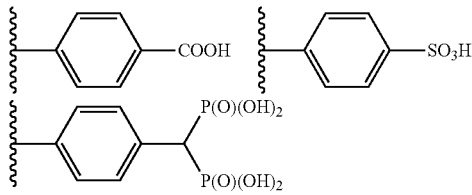

and the alkali metal salts, alkaline earth metal salts, and ammonium salts of these functional groups.

Other features which are considered as characteristic for the invention are set forth in the appended claims.

Although the invention is described herein as embodied in radiation-curable compositions of Pigment Violet 23 with improved removability from surfaces, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

The radiation-curable compositions of the invention contain the at least one Pigment Violet 23, containing at least one functional group of the formula (I), preferably in an amount of 1 to 40 wt %, more preferably in an amount of 5 to 30 wt %, based on the overall radiation-curable composition.

In one preferred embodiment the radiation-curable composition is curable with UV radiation or electronic radiation, more preferably with UV radiation.

The radiation-curable composition of the invention comprises a nonaqueous dispersion medium. The radiation-curable composition preferably comprises at least 10 wt %, more preferably at least 20 wt %, and very preferably at least 30 wt % of a nonaqueous dispersion medium, based on the overall radiation-curable composition. In one preferred embodiment the radiation-curable composition comprises 10 to 90 wt %, more preferably 20 to 80 wt %, and very preferably 30 to 70 wt % of a nonaqueous dispersion medium, based on the overall radiation-curable composition.

The nonaqueous dispersion medium comprises one or more radiation-curable organic compounds. Suitable in principle for the compositions of the invention are all radiation-curable organic compounds which are normally used in UV inks. Such compounds are known fundamentally to the skilled person. They comprise, in general, polymerizable monomers, which may have different degrees of functionalization and may be doubly, triply or more highly functionalized, for example. Preferred radiation-curable organic compounds are selected from acrylates, as for example 1,6-hexanediol diacrylate or dipropylene glycol diacrylate, methacrylates, as for example 1,1,1-trimethylolpropane trimethacrylate, vinyl ethers, as for example triethylene glycol divinyl ether, and N-vinylamides, as for example N-vinylformamide.

The radiation-curable compositions of the invention comprise at least one dispersant, which may also be referred to as a dispersing assistant. This is at least one interface-active substance which is intended to facilitate the dispersing of the Pigment Violet 23 solid in the liquid, nonaqueous dispersion medium, by reducing the interfacial tension between the two components. Suitable in principle are all dispersants which are normally used for UV inks with solid pigment constituents. Such dispersants are known fundamentally to the skilled person. The at least one dispersant is selected for example from oligomeric titanates and silanes, oligomeric and polymeric carboxylic acids, polyamines, salts of long-chain polyamines and polycarboxylic acids, soylecithin, and the like. Dispersants of these kinds are available commercially from, for example, Lubrizol Advanced Materials, Inc., Brecksville, USA, under the brand name Solsperse®; from BASF SE, Ludwigshafen, Germany under the brand name Efka®; or from BYK-Chemie GmbH, Wesel, Germany, under the brand name BYKJET®.

In the compositions of the invention the weight ratio of at least one Pigment Violet 23 of the invention to the at least one dispersant is preferably in the range from 1:10 to 10:1, more preferably in the range from 1:5 to 5:1, and very preferably in the range from 1:2 to 2:1.

The compositions of the invention comprise the at least one dispersant preferably in an amount of 1 to 30 wt %, more preferably in an amount of 5 to 20 wt %, based on the overall radiation-curable composition.

The radiation-curable compositions of the invention may additionally comprise further substances, which may also be referred to as additives. Preferred additives are those which are normally used in UV inks for inkjet printing, examples being photoinitiators, stabilizers, fillers, wetting agents, antistatic agents, lubricants, and the like. Besides the modified Pigment Violet 23, the radiation-curable compositions of the invention may also comprise further colorants such as organic or inorganic pigments, for example.

The surfaces which may become soiled with the UV ink, containing the radiation-curable composition of the invention, in conventional inkjet printing machines and which can be cleaned particularly easily in a contactless procedure preferably comprise silicon, fluorinated silicon materials, or stainless steel. More preferably the surfaces comprise fluorinated silicon materials. Such surfaces are encountered particularly in the region of the inkjet printheads.

A further subject of the invention is a method for producing a radiation-curable composition as specified herein, more particularly as specified herein as being preferred, wherein:

i) at least one Pigment Violet 23 containing at least one functional group of the formula (I) as defined herein is provided, and ii) the at least one Pigment Violet 23 containing at least one functional group of the formula (I) which is provided in step i) is dispersed in a nonaqueous dispersion medium, using at least one dispersant.

As the at least one dispersant and the nonaqueous dispersion medium, preference is given in the method of the invention to the dispersants stated as preferred and the nonaqueous dispersion media stated as preferred above for the radiation-curable compositions of the invention.

The dispersing in step ii) may take place according to methods known fundamentally to the skilled person, as for example using agitator mills, dissolvers, rotor-stator mills, ball mills, and the like.

A further subject of the invention is a method for producing a radiation-curable composition as specified herein, more particularly as specified herein as being preferred, wherein at least one Pigment Violet 23 containing at least one functional group of the formula (I) as defined herein is used in acid form in step i), the acid form having been obtained by the following method:
- Ia) providing an aqueous dispersion of at least one salt, more particularly alkali metal salt, of at least one Pigment Violet 23 containing at least one functional group of the formula (I) as defined herein,
- IIa) treating the aqueous dispersion provided in step Ia) with acid, and
- IIIa) isolating the acid form of the at least one Pigment Violet 23 containing at least one functional group of the formula (I).

Examples of suitable aqueous dispersions for step Ia) are aqueous dispersions available commercially from Cabot Corporation, Boston, USA.

The treating of the aqueous dispersion with acid in step IIa) may take place according to methods known fundamentally to the skilled person, as for example in reactors or using ion exchangers. Examples of suitable acids for the method of the invention are hydrochloric acid, sulfuric acid, organic sulfonic acids, and the like.

The isolating of the acid form in step IIIa) may take place according to methods known fundamentally to the skilled person, as for example by filtration, centrifugation or evaporation.

In a further preferred embodiment of the method of the invention for producing a radiation-curable composition as specified herein, more particularly as specified herein as being preferred, at least one Pigment Violet 23 containing at least one functional group of the formula (I) as defined herein is used in step i) in salt form, the salt form having been obtained by the following method:
- Ib) providing an aqueous dispersion of at least one salt, more particularly alkali metal salt, of at least one Pigment Violet 23 comprising at least one functional group of the formula (I) as defined herein,
- IIb) drying the aqueous dispersion provided in step Ib), and
- IIIb) optionally grinding the at least one salt, more particularly alkali metal salt, of the at least one Pigment Violet 23 as obtained in step IIb).

The drying of the aqueous dispersion in step IIb) may take place according to methods known fundamentally to the skilled person, as for example by evaporation of the water with supply of heat. The grinding carried out optionally in step IIIb) may take place in principle by any grinding methods known in principle to the skilled person, as for example using ball mills.

A further subject of the invention is an ink, more particularly UV ink, for inkjet printing, comprising a radiation-curable composition of the invention.

UV inks for inkjet printing that comprise the radiation-curable compositions of the invention with the modified Pigment Violet 23 can be removed particularly easily using conventional cleaning products from the surfaces in inkjet printing machines, as for example the Labelfire® inkjet printing machine from Heidelberger Druckmaschinen A G, Heidelberg, Germany, without any need for mechanical cleaning.

The invention claimed is:

1. A radiation-curable composition, comprising:
a) at least one Pigment Violet 23, containing at least one functional group of formula (I)

—X-E     (I)

where:
X is a bridging group selected from phenylene or methylenephenylene; and
E is a polar molecule radical which is bonded to the Pigment Violet 23 via the bridging group X;
wherein E is $(Z)_m(A)_n$ where:
Z is at least one polar functional group selected from at least one sulfonate radical, carboxylate radical or phosphonate radical;
A is a short-chain apolar molecule radical or a countercation selected from at least one proton, alkali metal cation, alkaline earth metal cation or an ammonium ion;
m is 1 or 2; and
n is 1, 2, 3 or 4;
b) at least one dispersant; and
c) a nonaqueous dispersion medium.

2. The radiation-curable composition according to claim 1, wherein the at least one functional group of the formula (I) is selected from:

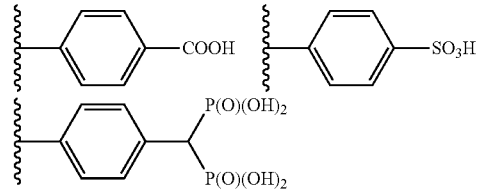

and alkali metal salts, alkaline earth metal salts, and ammonium salts of these functional groups.

3. A method for producing a radiation-curable composition, which comprises the steps of:
i) providing at least one Pigment Violet 23 containing at least one functional group of the formula (I):

—X-E     (I)

where:
X is a bridging group selected from phenylene or methylenephenylene; and
E is a polar molecule radical which is bonded to the Pigment Violet 23 via the bridging group X;
wherein E in the formula (I) is $(Z)_m(A)_n$ where:
Z is at least one polar functional group selected from at least one sulfonate radical, carboxylate radical or phosphonate radical;
A is a short-chain apolar molecule radical or a countercation selected from at least one proton, alkali metal cation, alkaline earth metal cation or an ammonium ion;
m is 1 or 2; and
n is 1, 2, 3 or 4; and ii) dispersing the at least one Pigment Violet 23 in a nonaqueous dispersion medium, using at least one dispersant.

4. The method for producing a radiation-curable composition according to claim 3, wherein the at least one Pigment Violet 23 containing the at least one functional group of the formula (I) is used in acid form in step i), the acid form having been obtained by the following method:
   a) providing an aqueous dispersion of at least one salt;
   b) treating the aqueous dispersion provided in step a) with acid; and
   c) isolating the acid form of the at least one Pigment Violet 23 containing the at least one functional group of the formula (I).

5. The method for producing a radiation-curable composition according to claim 4, wherein the at least one salt is an alkali metal salt.

6. An ink for inkjet printing, containing:
a radiation-curable composition, containing:
   a) at least one Pigment Violet 23, containing at least one functional group of formula (I)

—X-E  (I)

where:
X is a bridging group selected from phenylene or methylenephenylene; and
E is a polar molecule radical which is bonded to the Pigment Violet 23 via the bridging group X;
wherein E is $(Z)_m(A)_n$ where:
Z is at least one polar functional group selected from at least one sulfonate radical, carboxylate radical or phosphonate radical;
A is a short-chain apolar molecule radical or a countercation selected from at least one proton, alkali metal cation, alkaline earth metal cation or an ammonium ion;
m is 1 or 2; and
n is 1, 2, 3 or 4;
   b) at least one dispersant; and
   C) a nonaqueous dispersion medium.

* * * * *